United States Patent
Bakke et al.

[19]

[11] Patent Number: 5,875,558

[45] Date of Patent: *Mar. 2, 1999

[54] NUT AND BOLT HEAD MEASURING TOOL

[76] Inventors: John S. Bakke; David C. Bakke, both of 1247 Lorelei Ct., Campbell, Calif. 95008-1716

[ * ] Notice: This patent issued on a continued prosecution application filed under 37 CFR 1.53(d), and is subject to the twenty year patent term provisions of 35 U.S.C. 154(a)(2).

[21] Appl. No.: 823,450

[22] Filed: Mar. 24, 1997

[51] Int. Cl.⁶ .............................. G01B 3/38; G01B 3/40
[52] U.S. Cl. .................... 33/501.45; 33/199 R; 7/168; 81/52
[58] Field of Search .................. 33/501.45, 501.05, 33/501.08, 501.7, 501.11, 501.16, 199 R, 199 B, 201, 600, 562, 563, 571; 7/138; 81/52

[56] References Cited

U.S. PATENT DOCUMENTS

| | | |
|---|---|---|
| 363,331 | 5/1887 | Hammer ................................... 33/485 |
| 552,238 | 12/1895 | Darling ................................ 33/199 R |
| 1,107,276 | 8/1914 | Farrington ............................. 33/199 R |
| 1,755,152 | 4/1930 | Parker .................................... 33/501.08 |
| 3,218,724 | 11/1965 | Schaumberger ....................... 33/199 R |
| 3,396,472 | 8/1968 | Moss ...................................... 33/199 R |
| 4,138,820 | 2/1979 | O'Connor ............................. 33/199 R |
| 4,745,685 | 5/1988 | Castillo ................................. 33/199 R |
| 4,908,955 | 3/1990 | Nicholson ................................ 33/808 |
| 5,253,427 | 10/1993 | Barlett .................................. 33/501.45 |
| 5,471,757 | 12/1995 | McDonald ........................... 33/501.45 |
| 5,548,903 | 8/1996 | Johnson et al. ......................... 33/810 |

*Primary Examiner*—Christopher W. Fulton
*Attorney, Agent, or Firm*—Howard C. Miskin

[57] ABSTRACT

A measuring tool having a plurality of templates, each template having a socket opening therein. The size of the socket openings in each template are different from each other. The templates are mounted together with each template having a head portion, a shank portion and a rear-end. The templates are pivotally mounted together adjacent their rear-ends so that the templates are moveable from a folded compact position to an open position. The head portions are wider than the shank portions and are thin and light-weight. Openings are provided in the rear ends so that the templates may be pivotally mounted together at the rear-ends. The templates are of different sizes with the larger nut socket located in the longer template.

8 Claims, 5 Drawing Sheets

NUT AND BOLT HEAD MEASURING TOOL

BACKGROUND

The present invention relates to a nut and bolt head measuring tool and more particularly to a lightweight, manually usable nut and bolt head measuring tool for quickly determining the size of a nut or bolt head.

Presently, in order to determine the size of a nut or bolt head, one uses a trial-and-error method of fitting different size wrenches over the nut or bolt head until one discovers which wrench fit perfectly. Wrenches are heavy and cumbersome, and time and effort is consumed in this trial-and-error method because one usually cannot handle more than one wrench at once and must keep returning to the tool box to find another size wrench until the right size is finally chosen. Sometimes nut and bolts are located in tight or restrictive spaces where a wrench cannot reach with facility, thus creating a greater waste of time and effort as the user attempts to discover the proper wrench-size to use.

The hand-and-eye comparison method is also used to measure the size of the threads in a particular bolt. Once again, the common process is to compare (or even count) the size of the threads in an existing bolt with the size of the threads in a replacement bolt until one finds a replacement bolt with the correct dimensions. This is time consuming, clumsy and often inaccurate.

OBJECTS

The present invention avoids these drawbacks and has for one of its objects the provision of an improved measuring tool for determining the size of a nut or bolt head.

Another object of the present invention is the provision of an improved measuring tool for measuring the size of the threads in a bolt.

Another object of the present invention is the provision of an improved measuring tool which allows the user to easily determine which size wrench to use.

Another object of the present invention is a the provision of an improved measuring tool which allows the user to easily determine the size of the threads in a replacement bolt.

Another object of the present invention is the provision of an improved measuring tool which is light and easily handled manually.

Other and further objects of the invention will be obvious upon an understanding of the illustrative embodiment about to be described, or will be indicated in the appended claims and various advantages not referred to herein will occur to one skilled in the art upon employment of the invention in practice.

BRIEF DESCRIPTION

The present invention comprises a of a light-weight tool comprising a plurality of templates which may be made of metal wood, plastic, card-board or other light-weight material. Each template has a nut socket on one end and is preferably made of a rigid material. A plurality of these ten plates are pivotally mounted together at the other end so that they may be folded into a compact tool or opened when in use. Such a tool is more facile in restrictive spaces than a wrench. The nut sockets on the different templates are of different sizes and the nut socket sizes are preferably marked on each template. The nut socket of a particular template may be applied to a bolt or nut to determine its size. Since the present invention provides a tool which has its nut sockets scaled to standard sizes, one need merely fit the proper one onto the nut or bolt head to determine the proper size.

Thread notches may also be provided on at least some of the templates which are scaled to standard thread sizes. The thread notches are preferably marked to indicate thread size and length. Hence, the user need merely apply the existing bolt up against the proper thread notches to ascertain the thread size of bolt threads.

In this novel manner, the tool of the present invention saves time and effort and creates an inexpensive and convenient tool for replacing nut or bolts, for finding the proper wrench size to use on a particular nut or bolt, and for ascertaining the size of the threads in a bolt.

DRAWINGS

A preferred embodiment of the invention has been chosen for purposes of illustration and and description and is shown in the accompanying drawings forming a part of the specification, wherein.

DESCRIPTION

Figure 3:
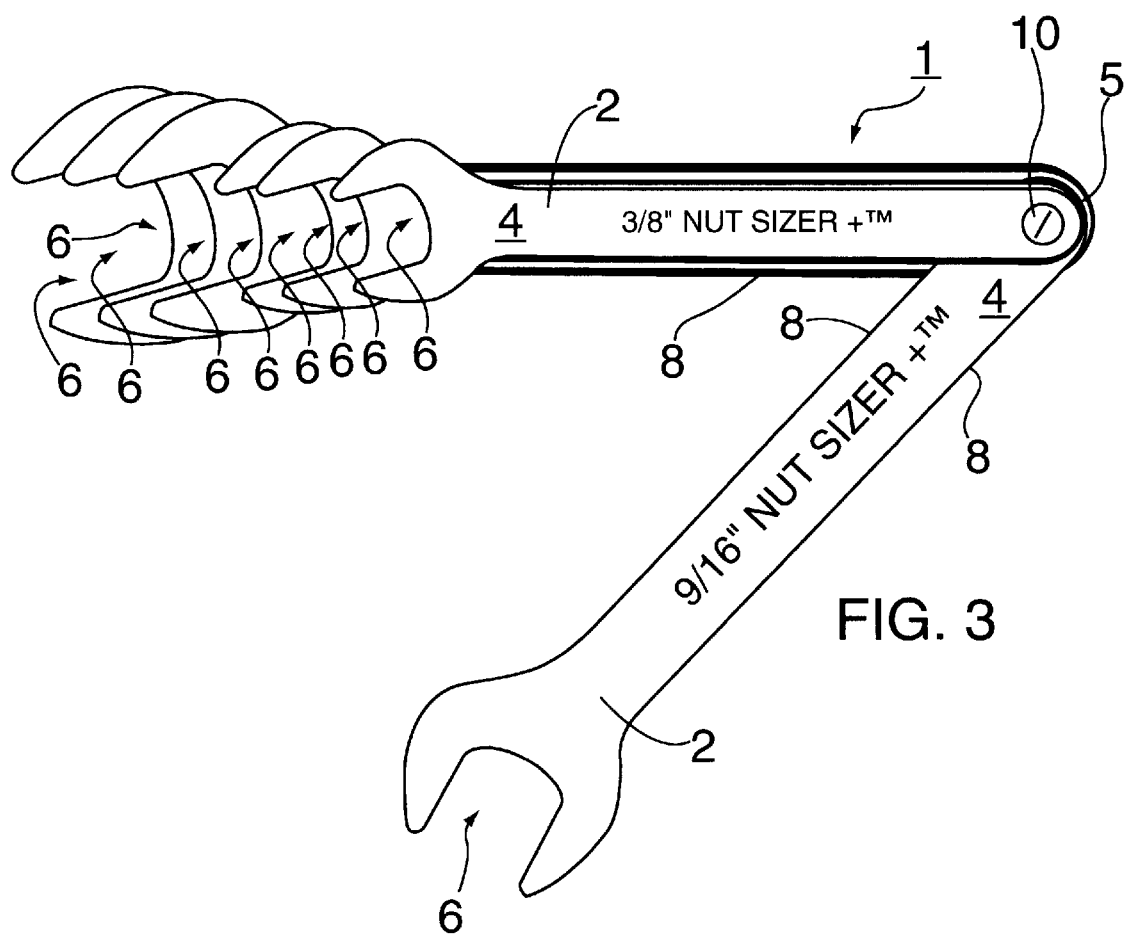
FIG. 3 is a plan view similar to FIG. 2 showing the manner of using the gauge of the present invention.
Figure 4:
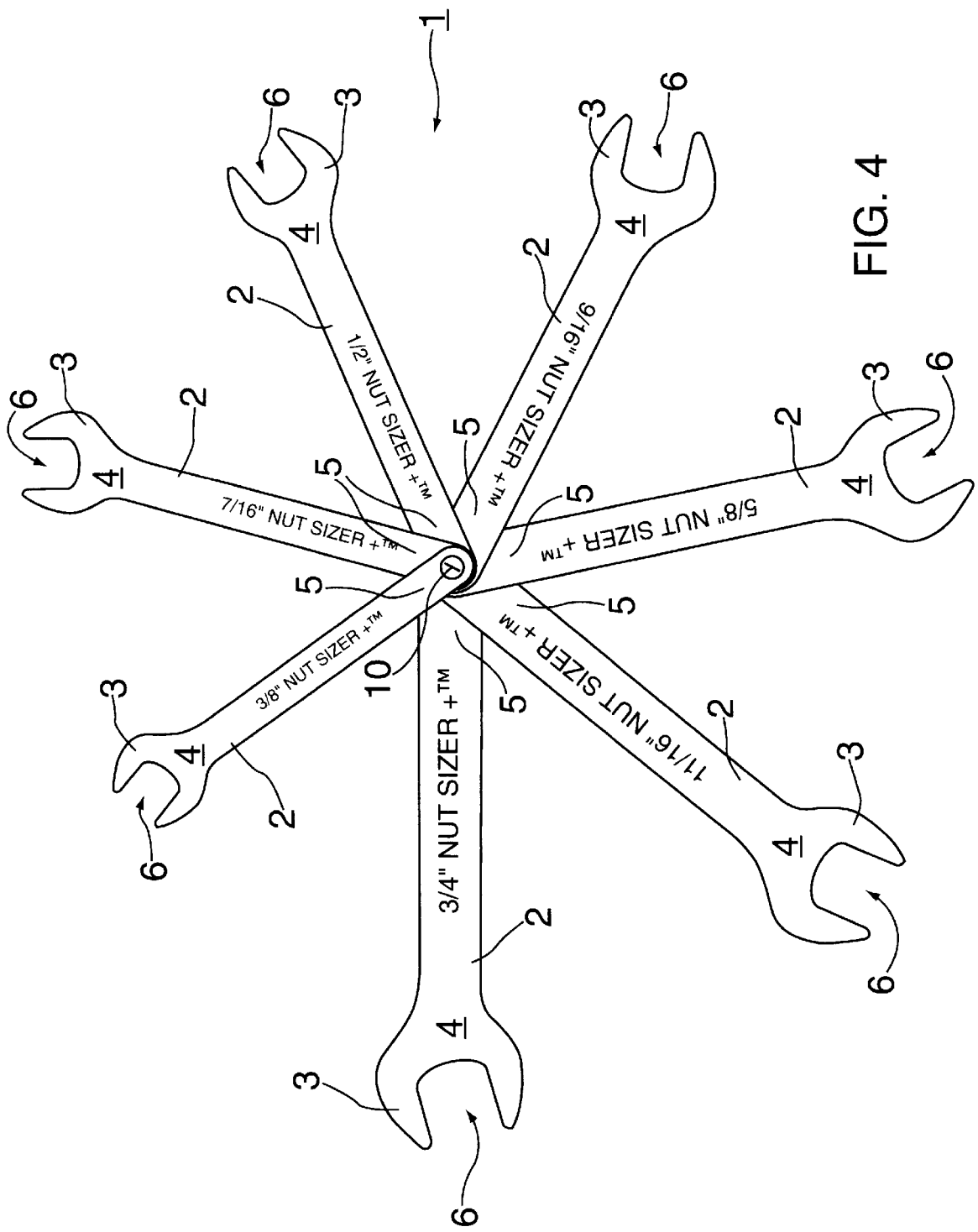
FIG. 4 is a plan view showing all the templates in the open position.

The measuring tool 1 of the present invention (FIG. 4) comprises a plurality of flat templates 2 which may be constructed of metal, wood, plastic, cardboard or some other suitable material. The templates 2 are preferably lightweight and rigid. Each template 2 has a head 3, a shank 4 and a rear end 5. Each head 3 has nut socket 6 formed therein which may be rectangular as shown in the drawings or any other shape. The rear end 5 of each template 2 has an opening 7 therein which permits a plurality of such templates 2 to be pivotally mounted together as by a nut or rivet 10. The plurality of templates are of different lengths and sizes. These sore graded from the shortest and smallest to the longest and largest. Each template 2 of a different size has a nut socket 6 of a different size. As shown in the drawing, the smallest nut socket 6 is in the smaller template 2 and the nut sockets 6 are gradually larger for each larger template until the largest nut socket 6 is in the largest template 2. Each template 2 is preferably marked with the particular size of the nut socket therein. The nut sockets 6 match standard sizes of bolt heads or nuts. The several templates 2 may be attached together by the openings 7 as shown in FIG. 4 so that they pivot relative to each other from a folded compact position to an open position. When in the folded position shown in FIG. 2 the tool is small enough to fit in the user's pocket or tool case. When opened (FIG. 3) the tool is still small enough to be easily manually handled.

Figure 6:
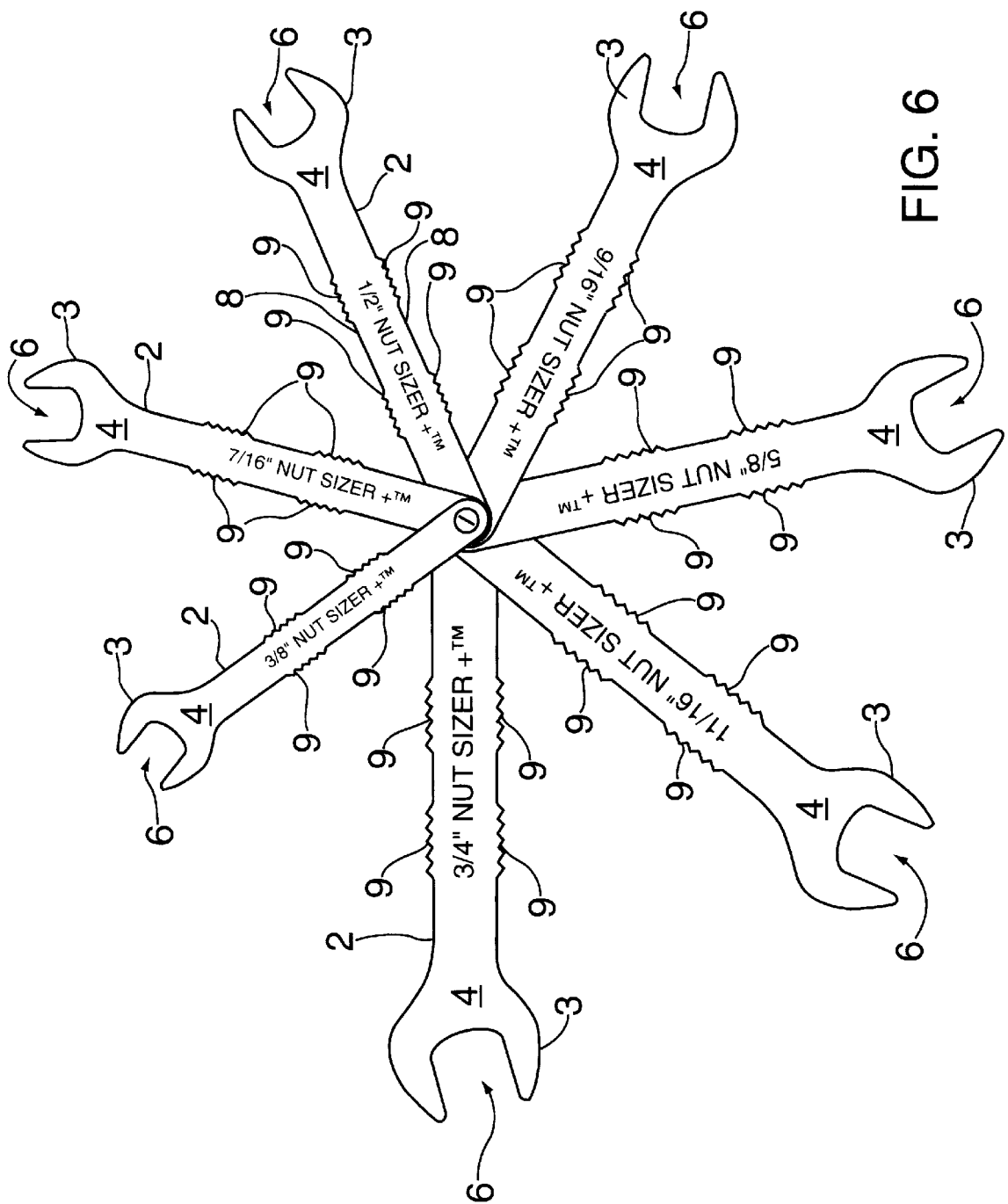
FIG. 6 is a plan view showing a modification of the present invention.

Referring to FIG. 6, the tool of the present invention may include thread identifier means. The side edges 8 of the templates 2 have a notch 9 on them which match the standard size threads on bolts. These notches 9 may be marked in inches and/or millimeters for easy identification.

The notches 9 may be located on each of a template 2 or on one edge only, as may be desired.

The measuring tool of the present invention can also provide an electronic readout mode (not shown). The measuring tool can be wired and battery-powered to be read as a Light Emitting Diode (LED) indicator using numbers or dots or it may be read as Liquid Crystal Display (LCD) indicator which will give correct sizes. This electronic version of the tool may be attached by a plug-in jack to an independent measuring unit such as a calculator or similar device.

Figure 1:
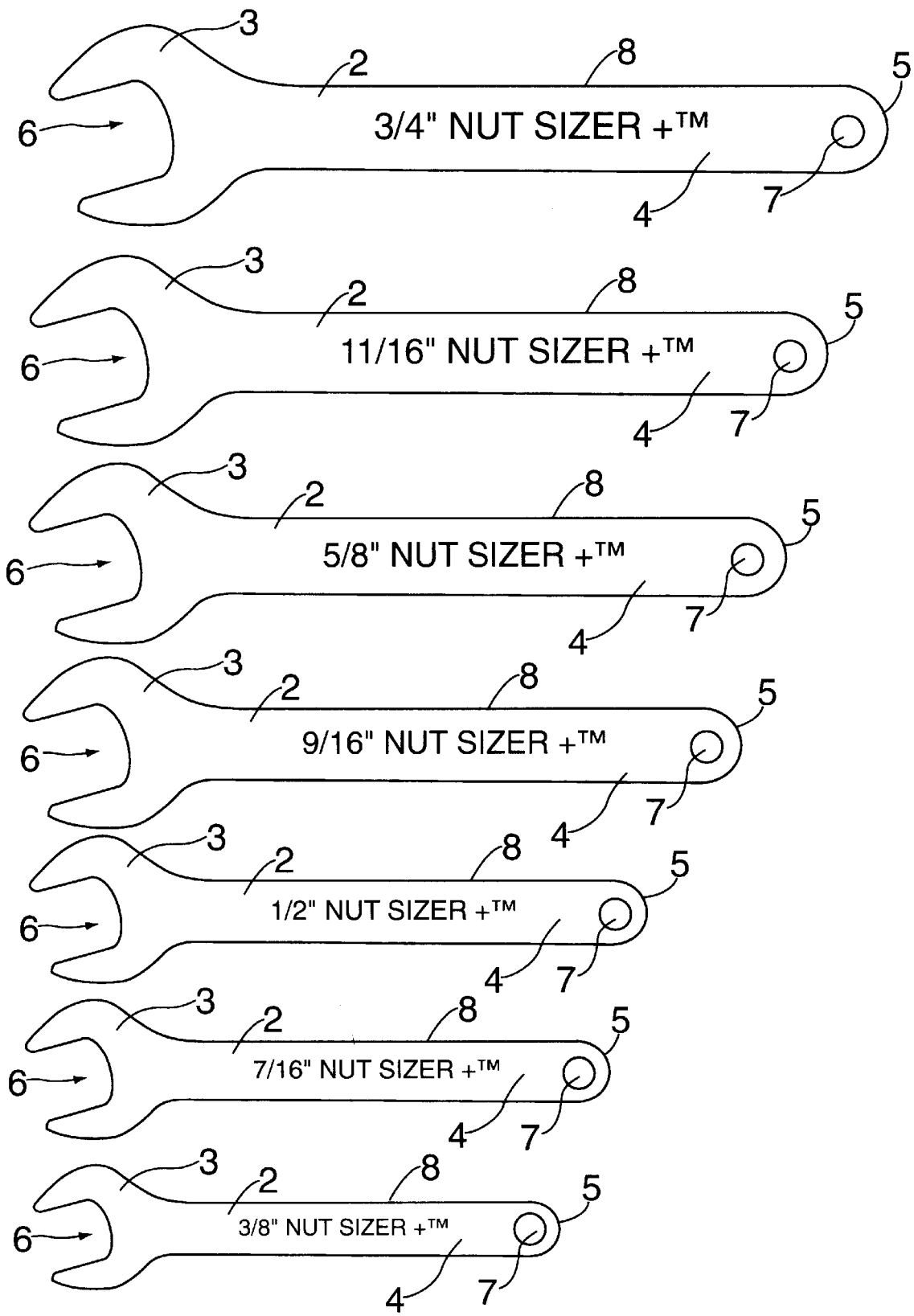
FIG. 1 is a plan view showing a number of templates to be assembled together in accordance with the present invention.
Figure 2:
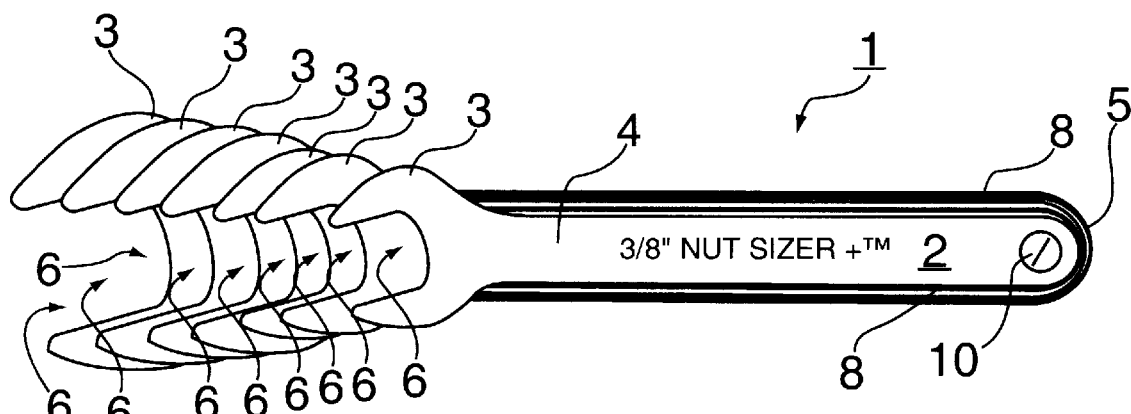
FIG. 2 is a plan view of the templates of FIG. 1 assembled together.
Figure 5:
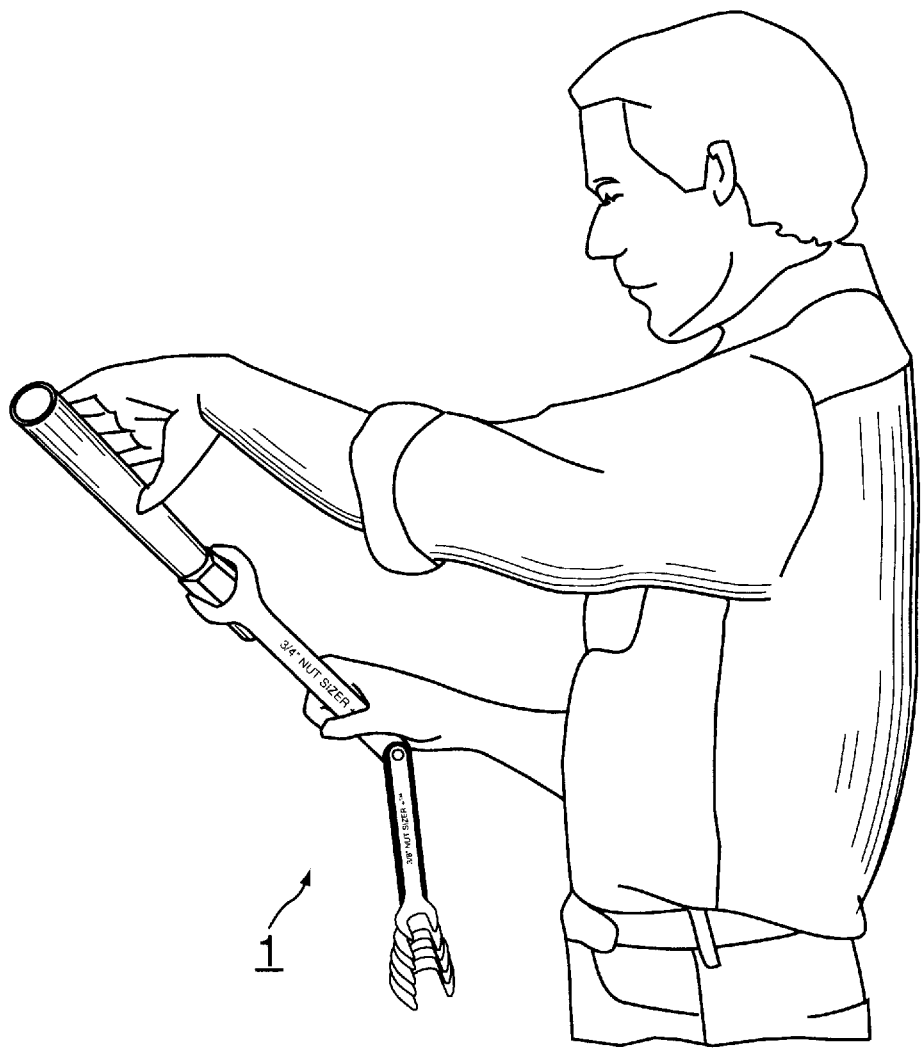
FIG. 5 is a plan view showing the tool in use.

In use, measuring tool 1 of the present invention may be carried in the pocket or in a tool chest in the compact folded condition shown in FIG. 2. When a nut or bolt head is to be measured, as shown in FIG. 5, one of the templates 2 is pivoted away from the rest of the templates 2 (FIG. 5) and is applied to the nut or bolt head to determine the proper size. If that particular template 2 does not fit then it is an easy matter for the user to pick another template 2 and try each one until the right size template 2 is found.

Similarly, in trying to measure the size of a particular thread, it is merely necessary to place a bold against the thread notches 9 on the edges 8 of the templates 2 until the proper thread size is matched with the thread on a bolt.

It will thus be seen that the present invention provides an improved measuring tool for determining the size of a nut or bolt head, for measuring the size of the threads in a bolt, and which is light and easily handled manually. The present invention also provides an improved measuring tool which allows the user to easily determine which size wrench to use and which allows the user to easily determine the size of the threads in a replacement bolt.

As many and varied modifications of the subject matter of this invention will become apparent to those skilled in the art from the detailed description given hereinabove, it will be understood that the present invention is limited only as provided in the claims appended hereto.

The embodiment of the invention in which an exclusive property or privilege is claimed as follows:

1. A measuring tool for measuring nuts and bolts comprising a plurality of templates, said templates being formed of a thin and light-weight material, each template having a head portion, shank portion and a rear end, each head portion having a socket opening therein, each of said socket openings defined by spaced apart substantially parallel facing side socket faces and a bottom socket face joining said side socket faces, said side socket faces being in substantially parallel planes, the size of the socket opening in each template being different from each other, each of said shank portions having an axis at an acute angle from said corresponding substantially parallel planes, thread-sized notches being provided along at least one of the edges of at least one of said shank portions, said templates being pivotally mounted together.

2. A measuring tool as claimed in claim 1 in which the said templates are pivotally mounted together adjacent their rear-ends whereby the templates are moveable from a folded compact position to an open position.

3. A measuring tool as set forth in claim 2 wherein the head portions are wider than the shank portions.

4. A measuring tool as set forth in claim 3 wherein openings are provided in the rear ends whereby the templates may be pivotally mounted together.

5. A measuring tool as set forth in claim 4 wherein the templates are of different sizes with the larger nut socket is in the longer template.

6. A measuring tool as set forth in claim 5 wherein a plurality of notches are provided on the edges of said shank portions, said notches being of different sizes.

7. A measuring tool as set forth in claim 6 wherein the size of said notches are marked in said shank.

8. A measuring tool as set forth in claim 7, wherein said tool is provided with electronic read-out means whereby the correct size is displayed electronically on a display unit.

\* \* \* \* \*